United States Patent Office 2,952,526
Patented Sept. 13, 1960

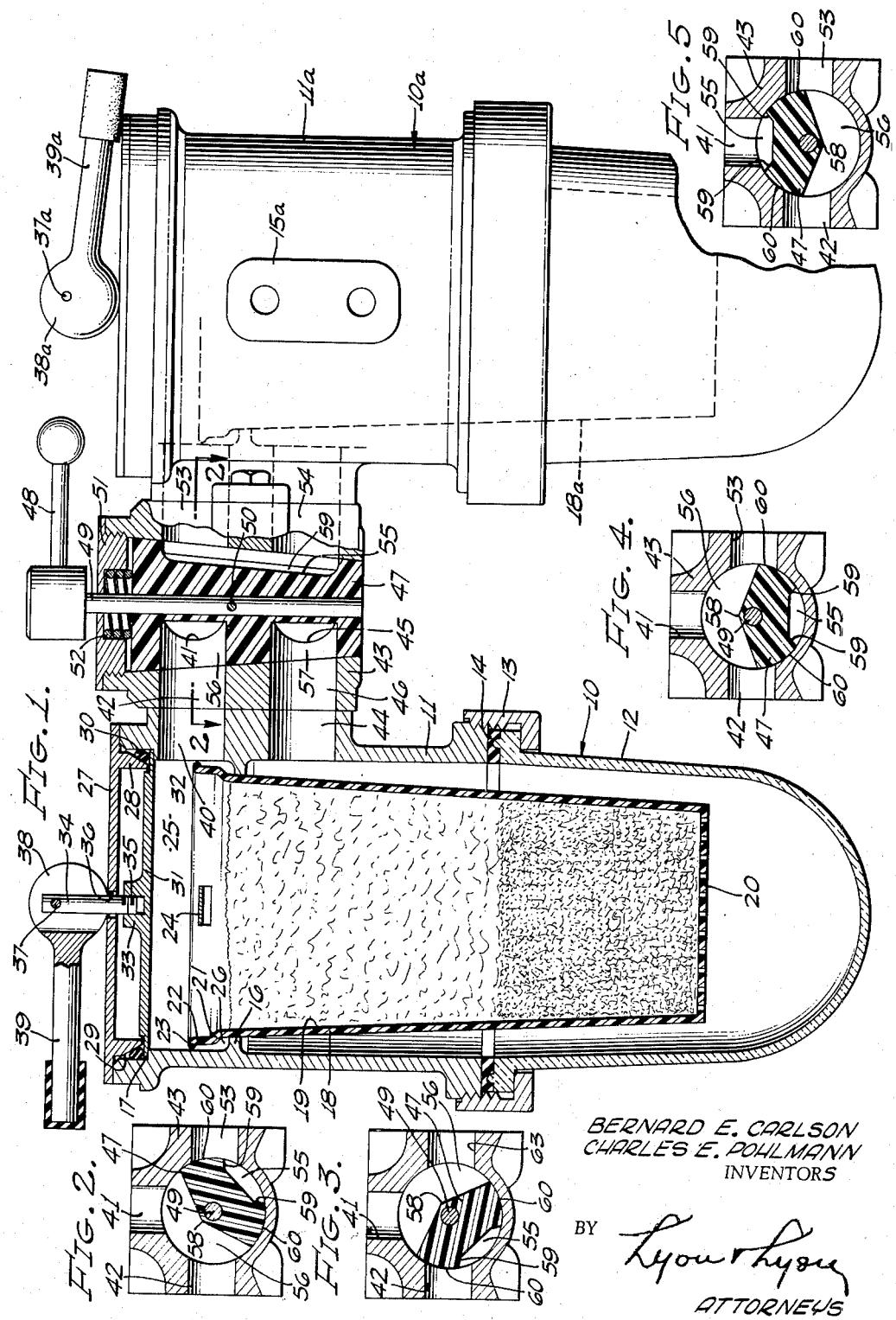

2,952,526

ABSORBER FOR ANESTHETIC GAS MACHINE

Bernard E. Carlson, La Crescenta, and Charles W. Pohlmann, Burbank, Calif., assignors to E. & J. Manufacturing Company, Burbank, Calif., a corporation of California Filed Feb. 8, 1957, Ser. No. 639,105

11 Claims. (Cl. 23—284)

This invention relates to an absorber for anesthetic gas machines, and particularly to an absorber having a selector valve and at least two removable canisters of absorbent material.

In the use of closed-system anesthesia it is necessary to have a carbon dioxide absorber in the breathing line. The absorber preferably has a selector valve and at least two absorbing containers, so that one container may be used while the other is being replaced. The selector valves used in the absorbers are exposed to the corrosive action of moisture and soda lime (a mixture of calcium oxide and sodium hydroxide). Moreover, a great deal of care must be taken with the lubricants used on such valves. Some lubricants may be removed by the ether in the gases passing through the valve. Other lubricants are dangerous when exposed to high oxygen concentrations. For these reasons, absorber valves have been very difficult to keep clean and in good operating condition.

It is also difficult to replace the absorbent material in the present absorbers. Water, produced in the absorption reaction, forms the soda lime into a hard cement-like lump. The absorber of this invention has a replaceable inner canister from which the absorbent may be easily removed.

It is also necessary for an absorber to have minimum resistance to the flow of gas. Such resistance is particularly important when high velocity gases pass through the system, as for instance, when a patient coughs or gasps.

The object of this invention is to provide an absorber in which the absorbent may be changed quickly, easily and inexpensively.

Another object of the invention is to provide an absorber in which most of the moisture and absorbent dust are trapped out before they reach the selector valve.

Another object of the invention is to provide an absorber having a versatile selector valve which will not corrode or stick and which is easy to clean.

A further object of the invention is to provide an absorber top which is easy to remove, and which provides a tight, reliable seal.

A still further object of the invention is to provide an absorber which offers a minimum resistance to the gases passing therethrough.

Other objects will become apparent from the following description of the preferred example of the invention in which:

Figure 1 is a side elevation, partially in section, of the absorber.

Figure 2 is a sectional view of the selector valve on the line 2—2 of Figure 1, showing the selector valve directing gases to the left absorber unit.

Figure 3 is a sectional view similar to Figure 2, showing the selector valve directing gases to the right absorber unit.

Figure 4 is a sectional view similar to Figure 2, showing the selector valve directing gases to both absorber units.

Figure 5 is a sectional view similar to Figure 2, showing the selector valve in the by-pass or recirculating position.

Referring now to the drawings, the absorber has a left absorber unit 10 and a right absorber unit 10a. A transparent bowl 12 is attached to the head 11 of the left absorber unit 10, by the screw ring 13. A gasket 14 is provided between the head 11 and the bowl 12. The bowl 12 may be made of glass or plastic. The head 11a has a boss 15a providing a means for attaching the absorber to a gas anesthesia machine (not shown).

The inside of the left head 11 is provided with a top ledge 17 and a canister flange 16 which seals tightly against the canister 18. The canister 18 has a tapered wall 19, a perforated bottom 20, a shoulder 21, a flared portion 22 and a rim 23. The canister 18 is preferably made of a somewhat flexible, transparent or translucent, plastic material and may be used as a disposable package in which the absorbent is marketed. A metal handle 24 is attached to the inside of the flared portion 22. An open space 25 is provided above the top of the canister 18 and an annular space 26 around the flared canister portion 21.

A top 27 rests on the top of the absorber head 11. The annular flange 28 extends downwardly from the top 27 and has a tapered outer surface 29. A rubber O-ring 30 fits over the lower end of the tapered surface 29 and is held in place by a plate 31. The plate 31 has a rim 32 over which the flange 28 fits. The plate 31 has a boss 33 in which the rod 34 is attached by the threads 35. The rod 34 passes through the top hole 36 and is connected by the pin 37 to the eccentric 38. The eccentric 38 is operated by the handle 39 which turns the eccentric so as to raise the plate 31 forcing the O-ring 30 up against the tapered surface 29 and expanding it against the inside of the absorber head 11.

The inlet 40 of the head 11 is connected to the used gas line 41 by the inlet passage 42 in the selector valve housing 43. Similarly, the head outlet passage 44, located below the inlet passage 42, is connected to the absorber return line 45 by the passage 46 in the valve housing. The frusto-conical valve body 47 is preferably made of Teflon, polyethylene, or other self-lubricating, inert, plastic material. The valve body 47 is connected to the selector valve control 48 by the rod 49 through which the pin 50 passes. The valve body 47 is held in the valve housing 43 by the valve housing top 51 acting against the spring 52. The valve housing 43 also has similar passages 53 and 54 leading to the right absorber head 11a.

The valve body 47 has a vertical slot 55 having a width approximately the diameter of the gas lines 41 and 45. The sides 59 of the slot are cut away to make the surfaces 60 of the valve body 47 smaller than the diameter of the gas lines 41 and 45. In this way the lines 41 and 45 can never be completely closed by the valve body 47. On the side of the body 47 opposite the vertical slot 55 the body is cut away to form the horizontal passages 56 and 57. On the circumference of the body 47 the passage 56 extends approximately half way around. In the center of the body 47 less than one-half of the passage is cut away, thus forming a V-shaped center portion 58.

In use, the hose to carry expired gases from the patient is attached to the used gas tube 41 and a hose to carry gases back to the patient is attached to the absorber return line 45. The selector valve handle 48 is turned to the by-pass or recirculating position shown in Figure 5. The handle 39 of the absorber top 27 is raised and the top removed. The canister 18 is removed by the handle 24 and replaced with a canister containing fresh absorbent. The absorber top 27 is replaced on the head 11 and the handle 39 pressed down against the top 27. As the handle 39 moves down, the rod 34 and the plate 31 are drawn up by the eccentric 38. The plate 31 forces the O-ring 30 up against the tapered surface 29, expanding it against the wall of the head above the top ledge 17. The tightest position of the lid is obtained with the handle 39 horizontal. Pushing the handle 39 down against the top locks it in place. The tightness of the seal formed by the O-ring 30 may be adjusted when the top is loose by turning the rod 34 in the threads 35 to obtain the desired effective length.

To operate the left absorber unit 10, the selector valve control 48 is turned until the valve body 47 takes the position shown in Figure 2. The gases then enter the used gas tube 41, pass through the horizontal passage 56 and the passages 42 and 40 into the absorber head 11. As the gases enter the head 11 they are partially deflected by the flared portion 22 of the canister, and pass through the annular space 26 around the canister. The gases then flow into the space 25 above the canister, and pass down through the absorbent material and the perforated canister bottom 20. As the gases pass through the absorbent, carbon dioxide is removed and water vapor is produced. Gases leaving the bottom 20 of the canister pass into the settling area 20a in the bottom of the bowl 12, where dust, absorbent particles and moisture vapor are trapped out. The gases then pass up along the outside walls of the absorber unit 10, through the outlet passages 44, 46 and 57 to the absorber return line 45. When the absorbent material is exhausted, the color of the indicator in the bottom of the canister may be seen through the walls of the bowl 12 and the canister 18. When an undesirable amount of water, dust and absorbent accumulates in the bottom of the bowl 12, the selector valve may be turned to the right absorber unit 10a, the screw ring 13 released, and the bowl 12 removed and emptied.

To use the right absorber unit 10a, the valve body 47 is turned to the position shown in Figure 3. When the patient has a particularly large lung capacity, the resistance to gas flow through the absorber may be reduced by using both canisters simultaneously. To do this the valve body 47 is turned to the position shown in Figure 4.

In some cases, it is desirable to recirculate a portion of the carbon dioxide to increase the patient's respiratory stimulus. This is done by placing the valve body 47 in the position shown in Figure 5. When the valve is in this position, gases flow from the used gas tube 41 down through the vertical slot 55 directly to the absorber return line 45. Three to five breaths without carbon dioxide absorption usually build up enough carbon dioxide in the system.

The selector valve is cleaned by unscrewing the top 51 and lifting the valve body 47 from its position in the valve housing 43. The valve housing 43, the passages 41, 42, 45, 46, 53, 54 and the valve body 47 are then thoroughly cleaned and the valve reassembled. If desired, a small amount of an inert sealant may be applied to the body 47. In general, a lubricant will not be necessary because of the self-lubricating properties of the plastic body.

The gradually tapered wall 19 aids in removal of the exhausted absorbent from the canister 18. If necessary the flexible walls 19 may be deformed to break the material. The gradual taper of the walls also allows the absorbent to be packed into the canister without unduly increasing the resistance to gas flow or restricting the gas flow to localized channels.

We claim:

1. An absorber for an anesthetic gas machine comprising: a selector valve having a valve housing, a gas inlet tube on said housing, a gas outlet tube below said inlet tube on said housing, a vertical, tapered, self-lubricating, plastic valve body in the valve housing, a vertical slot in said body adapted to connect said inlet and outlet tubes when so positioned, outer surfaces on said body having a width less than the diameter of the gas inlet tube, two horizontal slots in said body cutting through about half the circumference of the valve body, a V-shaped portion of the body extending from the back of the slot outwardly beyond the center of the valve body, a cap on said valve housing, a spring acting against said cap to hold the body in the housing, and means for turning the valve body; at least two absorber units, passages connecting said absorber units through the selector valve to the inlet and outlet tubes, an absorber head on each absorber unit, each having an annular canister flange on the inner head surface, a transparent glass bowl extending downwardly from said head, means for removably attaching said bowl to the head, a top unit on said head having a flat top plate, a downwardly extending flange on said top plate, a tapered outer surface on said flange, an elastic O-ring on said tapered surface, a bottom plate supporting said O-ring, a rod attached to said plate and passing through a hole in the top plate, thread means for adjusting the effective length of said rod, an eccentric operating against the top plate to raise and lower the bottom plate, and means for operating said eccentric; a canister in each absorber head, a translucent tapered, plastic canister body wedging tightly against the canister flange, a perforated bottom on said body, a settling area below said perforated bottom, a shoulder, a flared portion, and a rim on the top of said body, the top of said canister extending at least partially in front of the absorber head inlet passage.

2. An absorber for an anesthetic gas machine comprising: a selector valve having a valve housing, gas inlet and outlet tubes on said housing, a tapered, plastic valve body in said housing, a vertical slot in said body adapted to connect the inlet and outlet tubes together when so positioned, two horizontal slots in said body, a cap on said valve housing, a spring acting against said cap to hold the body down in the housing, and means for turning the selector valve body; at least two absorber units, absorber inlet and outlet passages adapted to connect through the horizontal valve passages to valve inlet and outlet tubes, an absorber head on each absorber unit, each head having a transparent glass bowl extending downwardly from said head, and means for removably attaching said bowl to said head; a top unit on said head having a downwardly extending flange, a tapered outer surface on said flange, an elastic O-ring fitting against said tapered surface, a bottom plate, a rod attached to said plate, an eccentric operating against the top unit to raise and lower the bottom plate, a canister suspended in each absorber head, a tapered, plastic canister body, and perforations in the bottom of said body, the top of said canister extending at least partially in front of the absorber inlet passage.

3. An absorber for an anesthetic gas machine comprising: two absorber units; an inlet tube and an outlet tube; valve switching means for connecting one of said units to the inlet and outlet tubes and reversible for connecting the other of said units to said tubes or for connecting said tubes together; an absorber head on each absorber unit; an inwardly extending canister flange in each head; inlet passages connected at one end to the valve switching means and at the other end to each head at a point above said flange; outlet passages connected at one end to the valve switching means and at the other end to each head below said flange; a canister suspended from the canister flange, said canister having a tapered, flexible body and a perforated bottom; and a top on each head, said top being easily removable while the head remains connected by the inlet and outlet passages to the valve switching means.

4. An absorber for an anesthetic gas machine as set forth in claim 3 wherein the top of the canister extends at least partially in front of the absorber head inlet and the canister flange seals tightly around an annular area on the tapered outer surface of the flexible canister body.

5. An absorber for an anesthetic gas machine as set forth in claim 3 wherein each head has a transparent, downwardly extending bowl and means removably attaching said bowl to the head.

6. An absorber for an anesthetic gas machine as set forth in claim 5 wherein the canister has light-transmitting walls and the lower end of the canister extends into the transparent bowl, whereby the color of the canister contents can be seen through the walls of the bowl and of the canister at a point near the end of the gas flow through the canister.

7. An absorber for an anesthetic gas machine as set forth in claim 3 wherein each of said absorber units is spaced horizontally from the valve switching means.

8. An absorber for an anesthetic gas machine as set forth in claim 3 wherein the valve switching means has a valve housing; a vertical tapered valve body in said housing; a vertical slot along the outside of said body adapted to connect the inlet and outlet tubes together when so positioned; and horizontal slots on the outside of said body adapted to connect the inlet and outlet tubes respectively to the inlet and outlet passages leading to the absorber heads.

9. An absorber for an anesthetic gas machine as set forth in claim 3 wherein the valve switching means has a vertical, tapered, self-lubricating valve body in said housing; a vertical slot along the outside of said body having approximately the width of the inlet and outlet tubes; two horizontal slots along the outside of said body approximately the same height as the inlet and outlet tubes and cutting through half the circumference of the valve body; means for holding the valve body in the housing; and means for turning the valve body.

10. An absorber for an anesthetic gas machine as set forth in claim 3 wherein the absorber head top has a flat top plate; a downwardly extending flange on said top plate; a flat tapered outer surface on said flange; an elastic O-ring having a thickness less than the length of the downwardly extending flange and a diameter less than the minimum diameter, but more than the maximum diameter of the tapered flange surface, around said tapered surface; a bottom plate supporting said O-ring; a rod attached to said plate and passing through a hole in the top plate; an eccentric operating against the top to raise and lower the bottom plate; and means for operating said eccentric whereby raising of said bottom plate forces the O-ring to move upwardly along said tapered outer surface, stretching said O-ring so that its outer edge projects beyond the edge of the bottom plate.

11. An absorber for an anesthetic gas machine comprising: a selector valve having a valve housing, gas inlet and outlet tubes on said housing, a tapered, plastic valve body in said housing, a vertical slot in said body adapted to connect the inlet and outlet tubes together when so positioned, two horizontal slots in said body, and means for turning the selector valve body; at least two absorber units, absorber inlet and outlet passages adapted to connect through the horizontal valve passages to valve inlet and outlet tubes, an absorber head on each absorber unit, each head having a transparent glass bowl extending downwardly from said head, and means for removably attaching said bowl to said head; a canister suspended in each absorber head, a tapered, plastic canister body, and perforations in the bottom of said body, the top of said canister extending at least partially in front of the absorber inlet passage.

References Cited in the file of this patent

UNITED STATES PATENTS

| 1,537,519 | Yablick | May 12, 1925 |
| 2,083,732 | Moore et al. | June 15, 1937 |
| 2,121,196 | Heidbrink | June 21, 1938 |
| 2,768,882 | Mattson | Oct. 30, 1956 |
| 2,837,413 | Hay | June 3, 1958 |

FOREIGN PATENTS

| 808,830 | France | Nov. 24, 1936 |